United States Patent [19]

Bobeczko

[11] Patent Number: 4,473,031
[45] Date of Patent: Sep. 25, 1984

[54] AUTOMATIC FEEDING DEVICE FOR ANIMALS

[76] Inventor: James D. Bobeczko, 9940 Cypress Cir., Concord Township, Cuyahoga County, Ohio 44060

[21] Appl. No.: 498,946

[22] Filed: May 27, 1983

[51] Int. Cl.³ ............................................. A01K 5/02
[52] U.S. Cl. .................................. 119/51.12; 119/51.5
[58] Field of Search ............... 119/51.11, 51.12, 51.13, 119/51.14, 51.15, 51.5

[56] References Cited

U.S. PATENT DOCUMENTS

| | | | |
|---|---|---|---|
| 2,157,682 | 5/1939 | Sweeny | 119/63 |
| 2,791,984 | 5/1957 | Franklin | 119/51 |
| 3,330,256 | 7/1967 | DeVaux | 119/51.12 |
| 3,532,075 | 10/1970 | Cooper | 119/51.12 |
| 3,599,608 | 8/1971 | Esquival | 119/51.12 |
| 3,631,840 | 1/1972 | McCormack | 119/51.12 |
| 3,646,912 | 3/1972 | Gardner | 119/51.12 |
| 3,720,186 | 3/1973 | O'Rourke | 119/51.12 |
| 3,874,341 | 4/1975 | Riba | 119/51.12 |
| 3,935,837 | 2/1976 | Mulhern | 119/51.12 |
| 3,942,478 | 3/1976 | Lane | 119/51.12 |
| 3,985,104 | 10/1976 | Klemer | 119/51.12 |
| 4,164,200 | 8/1979 | Gambling | 119/51.12 |

FOREIGN PATENT DOCUMENTS 2256924  5/1974  Fed. Rep. of Germany ... 119/51.12

Primary Examiner—Gene Mancene
Assistant Examiner—Kris R. Schulze
Attorney, Agent, or Firm—Porter & Associates Co.

[57] ABSTRACT

An automatic feeding device for animals includes a housing having multiple receptacles. Each receptacle is provided with a cover movable from a closed position to an open position. Each cover includes a latch for securing the cover in the closed position. The device includes an actuating mechanism for selectively releasing the covers. The actuating mechanism is in the form of a solenoid and a plurality of fingers connected to the solenoid. The fingers are arranged relative to each other such that, upon sequential actuation of the solenoid, the fingers sequentially engage and release the latches of the covers.

19 Claims, 13 Drawing Figures

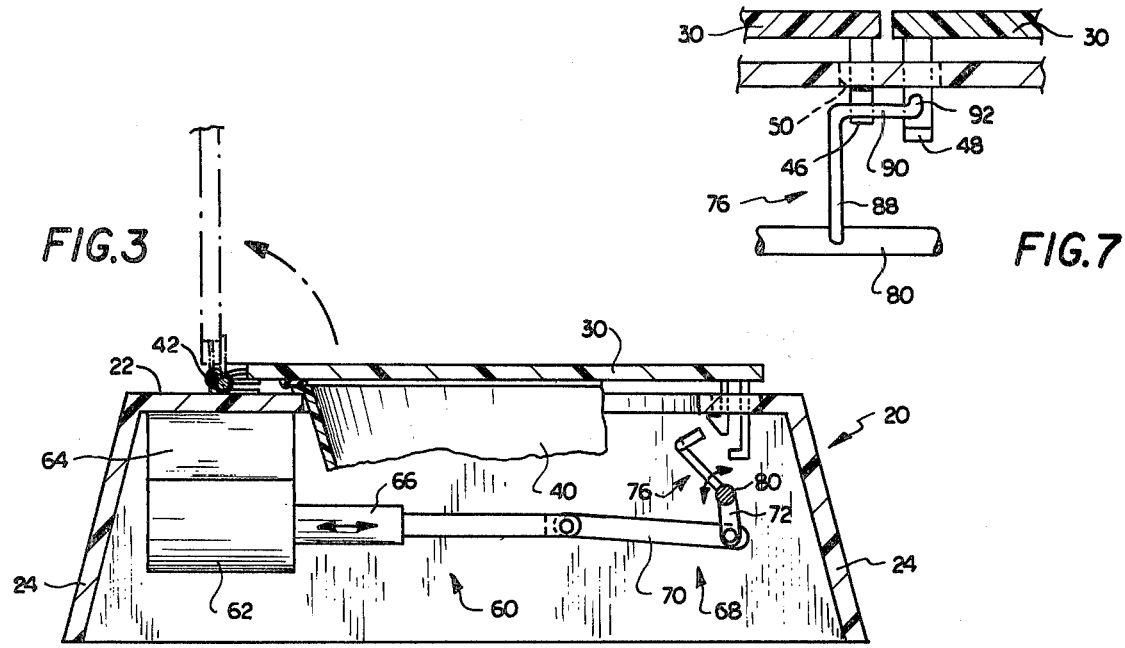
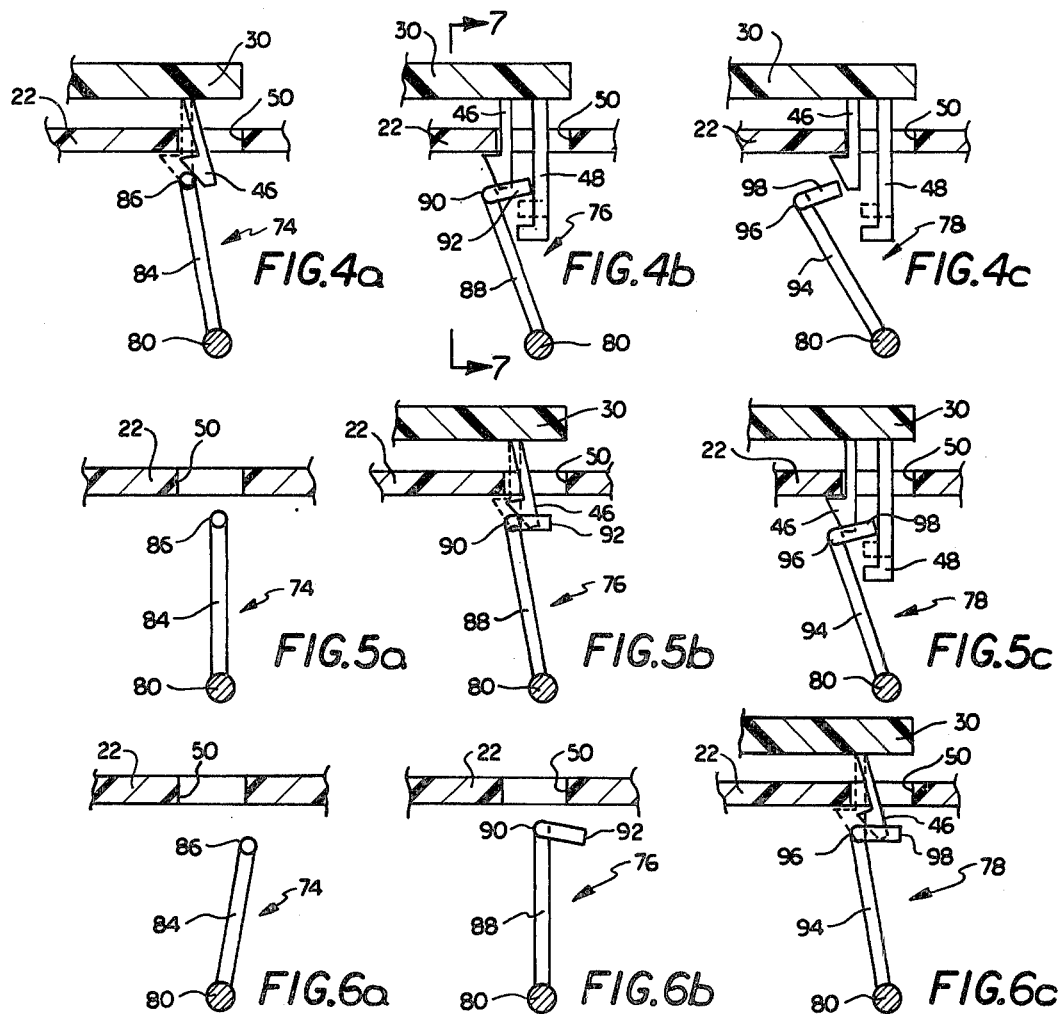

AUTOMATIC FEEDING DEVICE FOR ANIMALS

BACKGROUND OF THE INVENTION

1. Field of the Invention

The invention relates to automatic feeding devices for animals and, more particularly, to a feeding device where a single solenoid is used to sequentially uncover a plurality of receptacles.

2. Description of the Prior Art

Automatic feeding devices for animals have been known for some time. These devices usually include a plurality of food-containing receptacles each having a cover associated therewith. When the covers are in the closed position, the animal cannot have access to food contained in the receptacles. When the covers are moved to their open positions, the animal will be able to consume food contained in the receptacles. By appropriately controlling the opening of the covers, food can be provided for an animal over an extended period of time without human intervention being required.

Although properly functioning automatic feeding devices are known, certain drawbacks of these prior devices have come to light. Many of the prior devices are complex, expensive, and rather bulky. For example, one known device employs a plurality of receptacles each having a large cover associated therewith. Each of the covers except one includes a finger extending outwardly from its side. Each finger is engagable with an adjacent cover. The covers are held in a receptacle-closed position by a slide and by the interaction of each finger and the adjacent cover. The slide is movable along a generally linear path of travel. As the slide is moved along its path of travel, the covers are released sequentially so as to expose the contents of each receptable. Although this device is effective for the purpose of feeding animals automatically, it is unduly complex and expensive.

Certain prior devices are known in which simpler cover-actuating mechanisms are used. One such device employs a plurality of receptacles each having a spring-biased cover associated therewith. Each cover is provided with a solenoid-operated latch. By appropriately controlling operation of the individual solenoids, the covers can be released sequentially. Another, somewhat similar device employs a slidable cover biased to an open position by a spring. The cover is held in a closed position by a solenoid-actuated latch. Upon activating the solenoid, the latch is released and the cover is moved to the open position. Unfortunately, each of the referenced devices requires that a separate solenoid be associated with each cover. In order for a device having multiple covers to be operated properly, it is necessary that a specially designed timing mechanism be provided to control operation of the individual solenoids. Again, expense of the device is increased undesirably.

SUMMARY OF THE INVENTION

The present invention provides a new and improved automatic feeding device for animals wherein a plurality of receptacles, each having a cover, can be controlled by an inexpensive, reliable actuating mechanism. In a preferred embodiment, a commercially available timer controls operation of the actuating mechanism. Electrical signals from the timer control operation of a single solenoid and the single solenoid, in turn, provides a plurality of mechanical signals for opening individual ones of the covers.

In order to carry out the invention, a housing having multiple receptacles is provided. A cover is provided for each of the receptacles, each cover being movable from a receptacle-closed position to a receptacle-open position. Each cover is biased to the open position, but is held in the closed position by a latch.

A preferred form of actuating mechanism for sequentially releasing the covers to their open positions includes a solenoid and a plurality of fingers connected to the solenoid. The fingers are arranged relative to each other such that, upon actuation of the solenoid, the fingers are moved toward a position where the latches are engaged and, up deactivation of the solenoid, the fingers are moved toward a position where the latches are disengaged.

In a preferred embodiment of the invention, the first cover has a first latch as well as a catch. The second cover also has a latch and a catch, the latch of the second cover being located adjacent the catch of the first cover. Succeeding covers each have a latch and a catch, each latch being located adjacent the catch of the previous cover. The last cover has a latch disposed adjacent the catch of the penultimate cover but does not have a catch. A first finger is disposed adjacent the first cover and is positioned closer to the latches and catches then the other fingers. A second finger is disposed adjacent the second cover and is positioned further than the first finger from the latches and catches. Succeeding fingers are disposed adjacent respective succeeding covers and are disposed successively further than the preceeding fingers from the latches and catches. The last finger is disposed adjacent the last cover and is disposed further from the latches and catches than any of the preceeding fingers.

In operation, upon activation of the solenoid, the first finger engages and releases the latch of the first cover while the second finger engages the catch of the first cover. Upon deactivation of the solenoid, the second finger and the catch are disengaged and the first cover is opened. When the solenoid is activated a second time, the second finger engages and releases the latch of the second cover while the third finger engages the catch of the second cover. Upon deactivation of the solenoid, the third finger and the catch are disengaged and the second cover is opened. The sequence continues at intervals determined by the timer until all of the covers have been opened.

It will be apparent from the foregoing description that a feeding device according to the invention is exceedingly inexpensive and reliable. A single solenoid can be used to actuate a plurality of covers, and operation of the solenoid can be controlled by a commercially available, inexpensive timer. Further features and advantages of the invention will be apparent from the following description and claims, taken in conjunction with the accompanying drawings.

BRIEF DESCRIPTION OF THE DRAWINGS

FIG. 3 is a cross-sectional view of the device of FIG. 1 taken along a plane indicated by line 3—3 in FIG. 2;

FIGS. 4a, 4b and 4c are views taken along planes indicated by lines a—a, b—b, and c—c in FIG. 2 showing portions of an actuating mechanism in a first operating position;

FIGS. 5a, 5b and 5c are similar to FIGS. 4a, 4b and 4c showing components of the actuating mechanism in a second operating position;

FIGS. 6a, 6b and 6c are similar to FIGS. 5a, 5b and 5c showing components of the actuating mechanism in a third operating position; and FIG. 7 is a view taken along a plane indicated by line 7—7 in FIG. 4b.

DESCRIPTION OF THE PREFERRED EMBODIMENT

Figure 1:
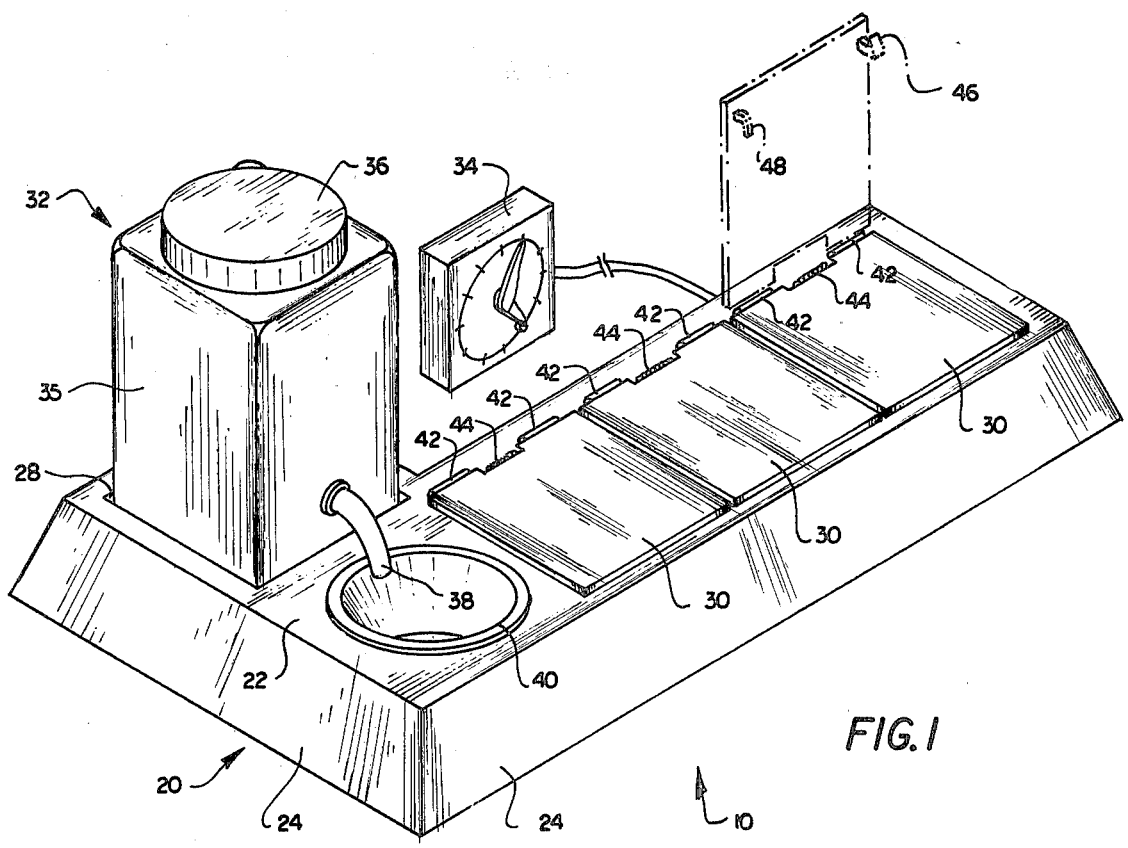
FIG. 1 is a perspective view of a feeding device according to the invention.
Figure 2:
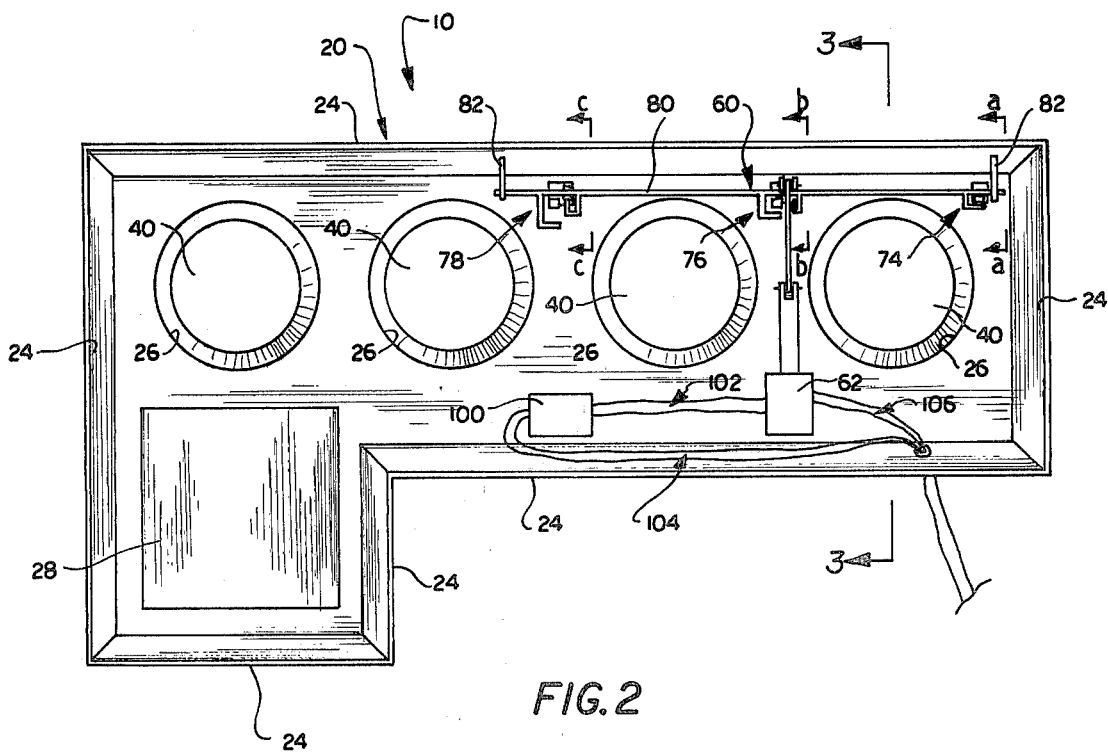
FIG. 2 is a bottom plan view of the device of FIG. 1.

Referring to FIGS. 1 and 2, an automatic feeding device for animals is indicated generally by the reference numeral 10. The device 10 includes a housing 20 formed in a molding operation from a synthetics plastics material. The housing 20 generally is hollow and includes a planar upper surface 22, sidewalls 24, a plurality of side-by-side openings 26, a depression 28 disposed adjacent one of the openings 26, and a plurality of covers 30 disposed adjacent the other openings 26. The device 10 also includes a water bottle 32 and a timer 34.

The water bottle 32 includes a large container 35 having a cover 36. The container 35 fits tightly within the depression 28 formed in the surface 22. The container 35 includes an outwardly extending spout 38. It is expected that the container 35, the cover 36 and the spout 38 will be formed in a molding operation from an inexpensive, synthetic plastics material. Techniques for forming such components are well known in the art and further description is not necessary.

A receptacle 40 is disposed within each of the openings 26. The receptacles 40 are identical and comprise a dish having tapered sides, a flat bottom, and a flat upper rim. As with many other components of the device 10, the receptacles 40 are molded from a synthetic plastics material that is both inexpensive and impervious to fluids. As can be seen from an examination of FIG. 1, the spout 38 extends downwardly into one of the receptacles 40 so as to establish a level of standing water. As will be apparent from an examination of FIGS. 1 and 3, the receptacles 40 can be removed easily from the housing 20 when the covers 30 are in their raised position.

Each of the covers 30 is a rectangular plate secured to the upper surface 22 by means of hinges 42. The covers 30 are biased to the receptacle-closed position illustrated in FIGS. 1 and 3 by means of springs 44. When the covers 30 are in the receptacle-closed position, a tight seal is provided against the upper rim of the receptacles 40. If desired, a compressible seal may be secured to the underside of the cover 30 or to the upper rim of the receptacle 40 in order to provide an even tighter seal. It also will be appreciated that various alternative techniques can be employed to secure the covers 30 to the housing 20. For example, a so-called "live" hinge formed of a synthetic plastics material may act both as a hinge and as a biasing means for the covers 30.

Each of the covers 30, except the cover 30 disposed adjacent the water bottle 32, includes a latch 46 and a catch 48. The cover 30 next to the bottle 32 has only a latch 46. As can be seen from an examination of FIGS. 1, 2, and 7, each latch 46 is disposed adjacent one corner of the cover 30, while each catch 48 is disposed adjacent the other corner of the cover 30. When the covers 30 are in the receptacle-closed position, the latches 46 and the catches 48 extend through openings 50 formed in the upper surface 22. Referring particularly to FIG. 7, it will be seen that the latch 46 of a given cover 30 is positioned adjacent the catch 48 of the preceeding cover 30. It also will be apparent from an examination of the various FIGURES that the latch 46 engages the underside of the surface 22 so as to hold the covers 30 in place. The catches 48 do not engage any portion of the housing 20.

Referring particularly to FIGS. 2 and 3, an actuating mechanism 60 is provided in order to control the opening of the covers 30. The actuating mechanism 60 includes a single solenoid 62 secured to the underside of the surface 22 by means of a bracket 64. A movable rod 66 extends outwardly of the solenoid 62 and is connected to a linkage 68 in the form of a pin 70 pivotally connected to a clevis 72. The actuating mechanism 60 includes a means for engaging and releasing selected ones of the catches 46. The means for engaging and releasing the catches 46 includes a plurality of fingers 74, 76, 78 each connected rigidly to a longitudinally extending rod 80 pivotally mounted to the housing 20 by means of brackets 82. The clevis 72 is rigidly secured to the rod 80 such that, upon actuation of the solenoid 62, the fingers 74, 76, 78 will be moved toward or away from the latches 46 and the catches 48. A spring (not shown) engages the rod 66 in order to constantly bias the solenoid 62 and, hence, the fingers 74, 76, 78, to a non-latch-engaging position (FIGS. 2 and 3).

Referring now to FIG. 2 and FIGS. 4a–6a, the finger 74 includes an elongate section 84 connected to the rod 80 and a laterally extending section 86 at the other end. Similarly, the finger 76 includes an elongate section 88, a laterally extending section 90, and a forwardly extending section 92. The section 90 extends generally at a right angle from the section 88, while the section 92 extends generally at a right angle from the section 90. The finger 78 is constructed similarly to the finger 76 and includes an elongate section 94, a laterally extending section 96, and a forwardly extending section 98. As can be seen from an examination of FIG. 2, the fingers 74, 76, 78 are secured to the rod 80 different radial positions. That is, the finger 74 is positioned closest to the latches 46, the next adjacent finger 76 is positioned further from the latches 46, while the last finger 78 is positioned furthest from the latches 46. This feature also can be seen in FIGS. 4a–4c, 5a–5c, and 6a–6c where each of the fingers 74, 76, 78 is positioned at a different radial location relative to the rod 80.

The device 10 also includes a time delay unit 100 secured to the underside of the surface 22 and disposed in the vicinity of the solenoid 62. The time delay unit 100 can be any commercially available time delay device that will prevent the flow of electrical current after a predetermined period of time has passed subsequent to the inception of a flow of current. An acceptable period of time for activation of the time delay unit 100 subsequent to the inception of a flow current is on the order of 0.1–0.5 second. The time delay unit 100 is connected to the solenoid 62 by a lead indicated at 102. The unit 100 also is connected to the timer 34 by means of a lead indicated at 104. The solenoid 62 also is connected to the timer 34 by means of a lead indicated at 106. The timer 34 is connected to a 110 volt electrical source by means of leads (not shown). The timer 34 can be any commercially available unit that will enable the user to select the time of day when a flow of electrical current is desired. The device 10 can be provided to the consumer without a timer 34 provided the consumer already owns a suitable timer and the need to use such a timer is made apparent at the time the consumer purchases the device 10.

OPERATION

After the receptacles 40 have been provided with food of the desired type and quantity, and after the water bottle 32 has been filled, the covers 30 are moved toward the receptacle-closed position against the bias of the springs 44 until the latches 46 engage the edges of the openings 50. At this point, the receptacles 40 will be tightly sealed. The leads 104, 106 then can be extended to the timer 34 and the timer 34 can be connected to a source of electrical current. Thereafter, the timer 34 can be set to activate the device 10 at any desired time.

When the selected time arrives, an electrical signal will be sent to the solenoid 62 and the time delay unit 100. In turn, the linkage 68 will be retracted and the fingers 74, 76, 78 will be advanced to that position shown in FIGS. 4a–4c. Because the finger 74 is positioned closest to the latches 46, the laterally extending portion 86 will engage the first latch 46, causing the latch 46 to be disengaged from the opening 50. Thereafter, the first cover 30 will be moved slightly toward a receptacle-open position.

Referring particularly to the dotted line position of the catch 48 shown in FIG. 4b, the forwardly extending portion 92 of the finger 76 will engage the catch 48 of the first cover 30 and further pivotal movement of the rod 80 will be halted. Due to the configuration of the finger 76, the latch 46 of the second cover 30 will not be engaged by the laterally extending section 90. Because the finger 78 is positioned furthest from the latches 46, no contact of any kind will be made between the finger 78 and other components of the device 10. After a predetermined period of time established by the time delay unit 100 has passed, electrical current to the solenoid 62 will be stopped, whereupon the actuating mechanism 60 will be returned to the rest position as shown in FIGS. 2 and 3. At this point, the forwardly extending section 92 will disengage from the catch 48 and the first cover 30 will be moved to the receptacle-open position shown by the dotted lines in FIG. 1.

The succeeding covers 30 are opened in the same manner. That is, when the timer 34 once again supplies an electrical signal to the solenoid 62, the fingers 74, 76, 78 are advanced to that position shown in FIGS. 5a–5c. In turn, the latch 46 of the second cover 30 is released, the catch 48 of the second cover 30 is engaged by the third finger 78, and, upon termination of the electrical signal to the solenoid 62, the fingers 74, 76, 78 are retracted and the second cover 30 is released.

When the timer 34 sends another electrical signal to the solenoid 62, only the third cover 30 will be acted upon. As shown in FIGS. 6a–6b, the finger 78 immediately will engage and release the latch 46 of the third cover 30, whereupon the cover 30 will be raised immediately.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. Merely by way of example and without limiting other variations that are possible, the number of receptacles and the number of required latch-releasing mechanisms can be varied to suit the needs of various users. It is intended that the patent shall cover, by suitable expression in the appended claims, whatever features of patentable novelty exist in the invention disclosed.

What is claimed is:

1. An automatic feeding device for animals, comprising:
    a plurality of receptacles;
    a cover for each receptacle, each cover being movable from a receptacle-closed position to a receptacle-open position, each cover being held in the closed position by a latch; and
    an actuating mechanism for sequentially releasing the latches to permit the covers to be moved to their open positions, the actuating mechanism including a solenoid and a means for engaging the latches, the means for engaging the latches being connected to the solenoid, the means for engaging the latches being (a) brought into contact with a selected one of the latches upon activation of the solenoid, (b) brought out of contact with the selected latch upon deactivation of the solenoid and (c) brought into contact with a succeeding latch upon subsequent activation of the solenoid.

2. The automatic feeding device of claim 1, wherein each of the covers is biased to the open position by a spring.

3. The automatic feeding device of claim 1, wherein the means for engaging the latches is in the form of a plurality of fingers, each of the fingers being connected to a pivotally mounted rod, the rod being connected to the solenoid by a linkage.

4. The automatic feeding device of claim 1, wherein the solenoid is biased to a position where the means for engaging the latch is moved away from the latches.

5. The automatic feeding device of claim 4, wherein the solenoid is biased by a spring.

6. The automatic feeding device of claim 1 wherein:
    the first cover has a latch as well as a catch;
    succeeding covers except the last cover each have a latch and a catch, the latch of a given cover being disposed adjacent the catch of the previous cover; and
    the last cover has a latch disposed adjacent the catch of the penultimate cover.

7. The automatic feeding device of claim 6, wherein the means for engaging the latches is in the form of:
    a first finger disposed adjacent the first cover and positioned closer to the latche than other fingers;
    succedding fingers disposed adjacent respective succeeding covers and positioned successively further from the latches than the preceeding fingers; and
    a last finger disposed adjacent the last cover and positioned further from the latches than any of the preceeding fingers.

8. The automatic feeding device of claim 7, wherein:
    upon activation of the solenoid, the first finger engages and releases the latch of the first cover and the second finger engages the catch of the first cover;
    the third and succeeding fingers do not engage any of the latches and catches; and
    upon deactivation of the solenoid, the second finger releases the catch, whereupon the first cover is permitted to move to its open position.

9. The automatic feeding device of claim 8, wherein:
    upon the next activation of the solenoid, the second finger engages and releases the latch of the second cover and the third finger engages the catch of the second cover;

the succeeding fingers do not engage any of the latches and catches; and upon deactivation of the solenoid, the second finger releases the catch and the second cover is permitted to move to its open position.

10. The automatic feeding device of claim 1, further comprising a timer for activating the solenoid at predetermined intervals.

11. The automatic feeding device of claim 10, further comprising a time delay unit for deactivation of the solenoid subsequent to each activation of the solenoid.

12. The automatic feeding device of claim 11, wherein the time delay unit causes the solenoid to be deactivated after the passage of about 0.1–0.5 second.

13. The automatic feeding device of claim 1, wherein the receptacles are disposed side-by-side in a housing.

14. The automatic feeding device of claim 1, further comprising a seal disposed intermediate each cover and the receptacle associated with each cover.

15. The automatic feeding device of claim 1, further comprising a water bottle disposed for access at all times by animals having access to the automatic feeding device.

16. An automatic feeding device for animals, comprising:

a housing having multiple receptacles disposed side-by-side;

a cover for each receptacle, each cover being movable from a receptacle-closed position to a receptacle open position, each cover being held in the closed position by a latch, all but the last of the covers also having a catch, the latch of a given cover being disposed adjacent the catch of the previous cover; and an actuating mechanism for sequentially releasing the latches to permit the covers to be moved to their open positions, the actuating mechanism including a solenoid and a means for engaging the latches and catches, the means for engaging the latches and catches being connected to the solenoid, the means for engaging the latches and catches being in the form of:

a first finger disposed adjacent the first cover and positioned closer to the latches than other fingers;

succeeding fingers disposed adjacent respective succeeding covers and positioned successively further from the latches than the preceeding fingers; and a last finger disposed adjacent the last cover and positioned further from the latches than any of the preceeding fingers, the fingers being arranged relative to the latches and catches such that, upon activation of the solenoid, the first finger engages and releases the latch of the first cover and the second finger engages the catch of the first cover, the third and succeeding fingers do not engage any of the latches and catches, and, upon deactivation of the solenoid, the second finger releases the catch, whereupon the first cover is permitted to move to its open position.

17. The automatic feeding device of claim 16, wherein:

upon the next activation of the solenoid, the second finger engages and releases the latch of the second cover and the third finger engages the catch of the second cover;

the succeeding fingers do not engage any of the latches and catches; and upon deactivation of the solenoid, the second finger releases the catch and the second cover is permitted to move to its open position.

18. The automatic feeding device of claim 16, wherein the fingers are mounted on a pivotally mounted rod, and the rod is connected to the solenoid by a linkage.

19. The automatic feeding device of claim 18, wherein a spring is connected intermediate the housing and the linkage such that the solenoid and the fingers are biased to a position where the fingers are disengaged from the latches and catches.

* * * * *